2,965,670

ACYLATION OF HYDROXY NITRILES

David W. McDonald, Texas City, and Thomas C. Singleton, La Marque, Tex., assignors to Monsanto Chemical Company, St. Louis, Mo., a corporation of Delaware No Drawing. Filed Nov. 19, 1957, Ser. No. 697,337

4 Claims. (Cl. 260—465.4)

This invention relates to an improved process for the acylation of α-hydroxy nitriles.

The carboxylic acid esters of α-hydroxy nitriles are valuable intermediates in the synthesis of unsaturated nitriles. When subjected to pyrolysis, these esters give rise to unsaturated nitriles which are themselves required in the manufacture of numerous important synthetic products or which can be readily converted to compounds valuable in the production of pharmaceuticals, surface coatings, dyes, rubber chemicals, explosives, and the like. Acrylonitrile, for example, used in the production of synthetic rubber and important synthetic fibers, may be produced by the pyrolysis of α-acetoxypropionitrile, the acetic acid ester of α-hydroxypropionitrile or lactonitrile.

The reaction of α-hydroxy nitriles with organic carboxylic acids in the presence of an organic sulfonic acid catalyst and an entrainer for removing water from the sphere of the reaction under reflux temperature and pressure conditions to give azeotropic distillation of the particular entrainer used is known. The reaction is usually carried out by charging the reactants, with the carboxylic acid in molar excess, the catalyst, and the entrainer to a suitable reactor equipped with a reflux condenser and heating the mixture under reflux conditions until the reaction is complete as shown by the absence of water in the condensed entraining fluid. However, this process is not always as efficient as could be desired since large amounts of tar or residue are formed in the course of the reaction.

Recently, it has been determined that tar or residue formation in the acylation of α-hydroxy nitriles can be minimized by conducting the acylation reaction in a reactor to which a dehydrating or water-adsorbing agent such as silica gel has been added.

Now, it has been discovered that tar or residue formation can be even more effectively obviated by carrying out the reaction in the presence of silica gel together with a small amount of phosphoric acid. The effectiveness of this combination of additives is surprising since the phosphoric acid when employed by itself in the reaction has no beneficial effect on the amount of tar isolated from the reaction mixture. According to the invention, substantially equimolecular quantities of an α-hydroxy nitrile and an organic carboxylic acid are heated together in the presence of a solvent capable of forming an azeotrope with the water produced in the reaction, an organic sulfonic acid catalyst, silica gel, and a minor amount of phosphoric acid under reflux temperature and pressure conditions to give azeotropic distillation of the solvent and yield an acyl nitrile.

The invention is illustrated in the following examples which, however, are not to be construed as limiting it in any manner except as it is limited in the attached claims.

*Example I*

One mole of α-hydroxypropionitrile (lactonitrile), 1.2 moles of acetic acid, 0.08 mole of benzenesulfonic acid and 1.0 mole of p-xylene were charged to a suitable reactor and heated to reflux conditions at atmospheric pressure. The mixture was refluxed for one hour while a constant boiling mixture of p-xylene and water was taken overhead and condensed. The condensed material was allowed to settle, the lower water layer was removed, and the p-xylene entrainer was returned to the reaction zone. At the end of the reaction period, the solvent was stripped from the reaction mixture under vacuum and the remaining material was distilled at a pressure of 11 mm. of Hg absolute to recover the unreacted hydroxy nitrile and the product, α-acetoxypropionitrile. The fraction boiling above 85° C. at 11 mm. of Hg was weighed and that portion of it in excess of the amount of catalyst charged was classified as tar or residue. In this instance this fraction weighed 17.7 g. The ratio of the weight of the residue to the weight of α-hydroxypropionitrile charged was approximately 0.25.

*Example II*

Following the procedure of Example I and using the same quantities and conditions of reaction, several runs were made in which silica gel (28–200 mesh), phosphoric acid, and a combination of silica gel (28–200 mesh) and phosphoric acid, respectively, were present in the reactor during the reaction. The reaction mixture was treated in the manner of Example I except in those instances in which silica gel was used. In these cases, the reaction mixture was first filtered to remove the silica gel, the silica gel was washed with hot acetic acid, and the washings were combined with the filtrate prior to the distillation for recovery of the product. Tar formation was determined in each run. The amounts of additives employed, the amount of tar isolated from the reaction in which they were used, and the ratio of the tar or residue isolated to the weight of the α-hydroxypropionitrile fed is tabulated below. Example I where no additive was employed is included for purposes of comparison.

| Additives | None | Silica Gel | $H_3PO_4$ [a] | $H_3PO_4$ | Silica Gel $+H_3PO_4$ | Silica Gel $+H_3PO_4$ |
|---|---|---|---|---|---|---|
| Amt. Used (g.) | 0.0 | 50 | 1.1 | 0.2 | 50+1.1 | 50+0.2 |
| Residue or Tar (g.) | 17.7 | 12.2 | 18.1 | 20.1 | 9.9 | 8.4 |
| Wt. ratio of tar to α-hydroxy propionitrile. | 0.25 | 0.17 | 0.25 | 0.28 | 0.14 | 0.12 |

[a] Reaction time in this case was only 30 min. instead of one hour as in all others.

These data demonstrate that the addition of both silica gel and phosphoric acid to the reactor results in lower residue or tar formation than can be obtained by the use of either silica gel or phosphoric acid alone. In fact, phosphoric acid alone has no salutary effect at all with respect to tar suppression.

The amount of silica gel to be employed may be varied from about 50% to about 100% by weight of the α-hydroxy nitrile being reacted. Preferably, from about 70 to about 80% by weight is employed. The amount of phosphoric acid to be used in conjunction with the silica gel is very small and lies in the range from about 0.25% to about 1.5% by weight of the α-hydroxy nitrile charged. Particle size of the silica gel is not a critical variable. Any of the commercially available materials in mesh sizes such as 3–8, 6–12, 6–16, 14–20, 28–200, and through 325, for example, may be used. However, material in the finer mesh sizes such as 28–200 is preferred for this liquid phase reaction.

In addition to the α-hydroxypropionitrile of the examples, other α-hydroxy nitriles having the formula

RR'C(OH)CN wherein R is a lower alkyl radical such as methyl, ethyl, propyl, etc. and R' is hydrogen or a lower alkyl radical, are suitable. Individual compounds falling within this class are, for example, α-hydroxybutyronitrile, acetone cyanohydrin, methyl ethyl ketone cyanohydrin, and the like.

Suitable acids for esterifying the OH radical of the cyanohydrin are such acids as acetic, propionic, benzoic, stearic and oxalic acid.

The reaction is promoted by the use of an organic sulfonic acid catalyst such as the benzenesulfonic acid illustrated, or p-toluenesulfonic acid, 2-naphthalenesulfonic acid, 2,5-dimethylbenzenesulfonic acid, methanesulfonic acid and the like, with the aromatic sulfonic acids being preferred. Catalyst concentration is generally maintained in the range from about 0.01 to about 0.2 mole per mole of the hydroxy nitrile and preferably in the range from about 0.05 to about 0.1 mole per mole of the nitrile. The lower levels of catalyst concentration favor lower tar formation.

Substantially equimolecular proportions of the nitrile and the carboxylic acid are employed for best results. However, the acid may be used in excess as practiced in the prior art if desired.

A relatively inert material capable of forming an azeotrope with water, said azeotrope having a boiling point below the boiling point of either the esterifying acid or hydroxy nitrile, may be used to remove the water formed from the zone of the reaction. Suitable compounds for this purpose in addition to the p-xylene mentioned in the examples are benzene, toluene, o- and m- xylenes, cumene, n-propyl acetate, methyl n-propyl ketone, and the like.

While the examples show the use of one mole of solvent for every mole of hydroxy nitrile charged, the process is not limited to these proportions. The amount of solvent employed may be varied over a wide range. Generally, from one to about 5 moles of solvent are used per mole of hydroxy nitrile charged. In fact, with certain other conditions controlled, the use of at least five moles of solvent is preferred since this proportion of solvent also seems to suppress tar or residue formation.

The reaction temperature is dependent upon the particular hydroxy nitrile reacted and the entrainer employed. Generally, any temperature in the range from 80–150° C. is suitable. Temperature can also be a critical variable since tar or residue formation can be influenced by its control. Lower temperatures tend to prevent high tar or residue formation. Hence, the preferred temperature range is from 80–90° C. This range can be achieved by using low-boiling entrainers such as benzene or by conducting the reaction with the higher boiling entrainers under the reduced pressures required to secure the desired temperature.

What is claimed is:

1. In a process for producing esters of α-hydroxy nitriles which consists in reacting an α-hydroxy nitrile having the formula RR'C(OH)CN wherein R is a lower alkyl radical and R' is chosen from the group consisting of hydrogen and lower alkyl radicals with an organic carboxylic acid chosen from the group consisting of acetic, propionic, benzoic, stearic and oxalic acids in the presence of an aromatic sulfonic acid catalyst and in an entrainer under reflux conditions, said entrainer being selected from the group consisting of benzene, lower alkyl-substituted benzenes, n-propyl acetate and methyl n-propyl ketone, the improvement which comprises conducting the reaction in the presence of silica gel and phosphoric acid, the amounts of silica gel and phosphoric acid employed being in the range from about 50% to about 100% and from about 0.25% to about 1.5%, respectively, by weight of the α-hydroxy nitrile charged to the reaction.

2. In a process for producing esters of α-hydroxy nitriles which consists in reacting an α-hydroxy nitrile having the formula RR'C(OH)CN wherein R is a lower alkyl radical and R' is chosen from the group consisting of hydrogen and lower alkyl radicals with an organic carboxylic acid chosen from the group consisting of acetic, propionic, benzoic, stearic and oxalic acids in the presence of an aromatic sulfonic acid catalyst and in an entrainer under reflux conditions, said entrainer being selected from the group consisting of benzene, lower alkyl-substituted benzenes, n-propyl acetate and methyl n-propyl ketone, the improvement which comprises conducting the reaction in the presence of silica gel and phosphoric acid, the amounts of silica gel and phosphoric acid employed being in the range from about 70% to about 80% and from about 0.25% to about 1.5%, respectively, by weight of the α-hydroxy nitrile charged to the reaction.

3. In a process for producing α-acetoxypropionitrile by the reaction of α-hydroxypropionitrile with acetic acid in the presence of an aromatic sulfonic acid and in an entrainer under reflux conditions, said entrainer being chosen from the group consisting of benzene, lower-alkyl-substituted benzenes, n-propyl acetate, and methyl n-propyl ketone, the improvement which comprises conducting the reaction in the presence of silica gel and phosphoric acid, the amounts of silica gel and phosphoric acid being in the range from about 50% to about 100% and from about 0.25% to about 1.5%, respectively, by weight of the α-hydroxy nitrile charged to the reaction.

4. In a process for producing α-acetoxypropionitrile by the reaction of α-hydroxypropionitrile with acetic acid in the presence of benzenesulfonic acid and in p-xylene under reflux conditions, the improvement which comprises conducting the reaction in the presence of an amount of silica gel in the range from about 70% to about 80% by weight of the α-hydroxypropionitrile charged to the reaction and an amount of phosphoric acid in the range from about 0.25% to about 1.5% by weight of said α-hydroxypropionitrile.

References Cited in the file of this patent

UNITED STATES PATENTS 2,155,625   Von Retze _____ Apr. 25, 1939
2,396,292   Slotterbeck _____ Mar. 12, 1946